M. D. MOORE.
REPLANTING ATTACHMENT FOR CULTIVATORS.
APPLICATION FILED APR. 7, 1908.
906,446.
Patented Dec. 8, 1908.
2 SHEETS—SHEET 1.
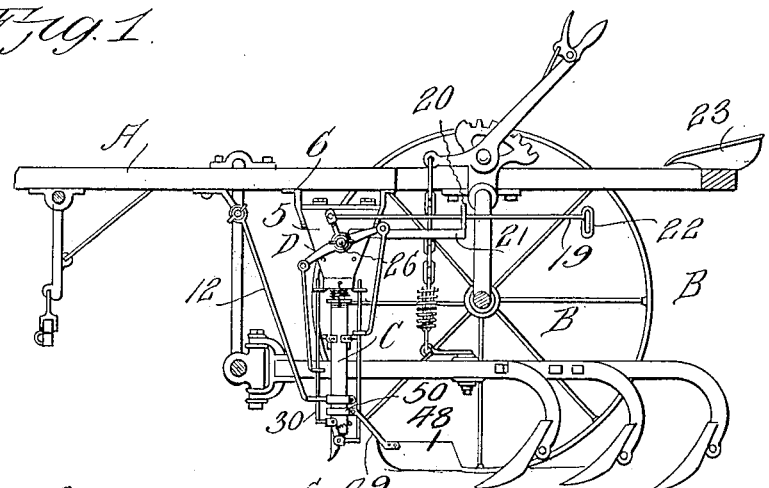
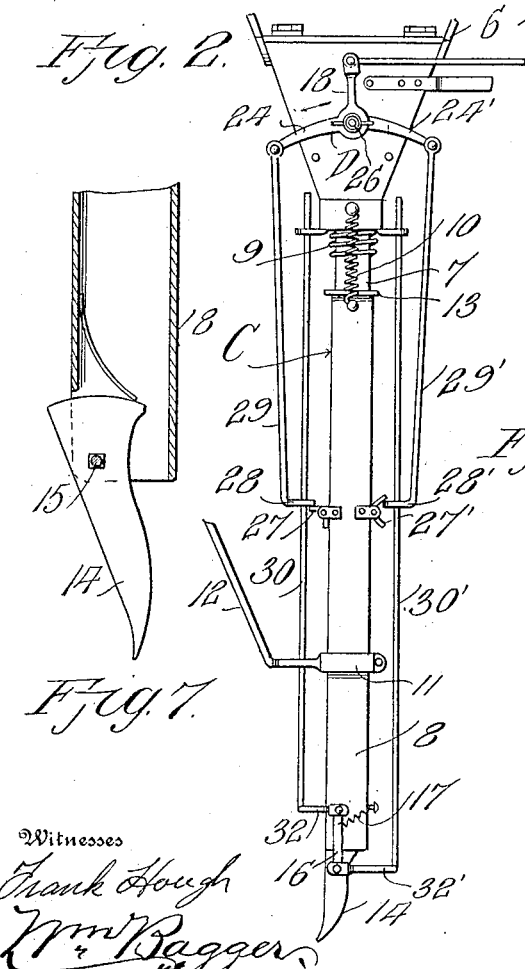
Witnesses
Frank Hough
Wm. Bagger
Inventor
Marcus D. Moore,
By Victor J. Evans
Attorney

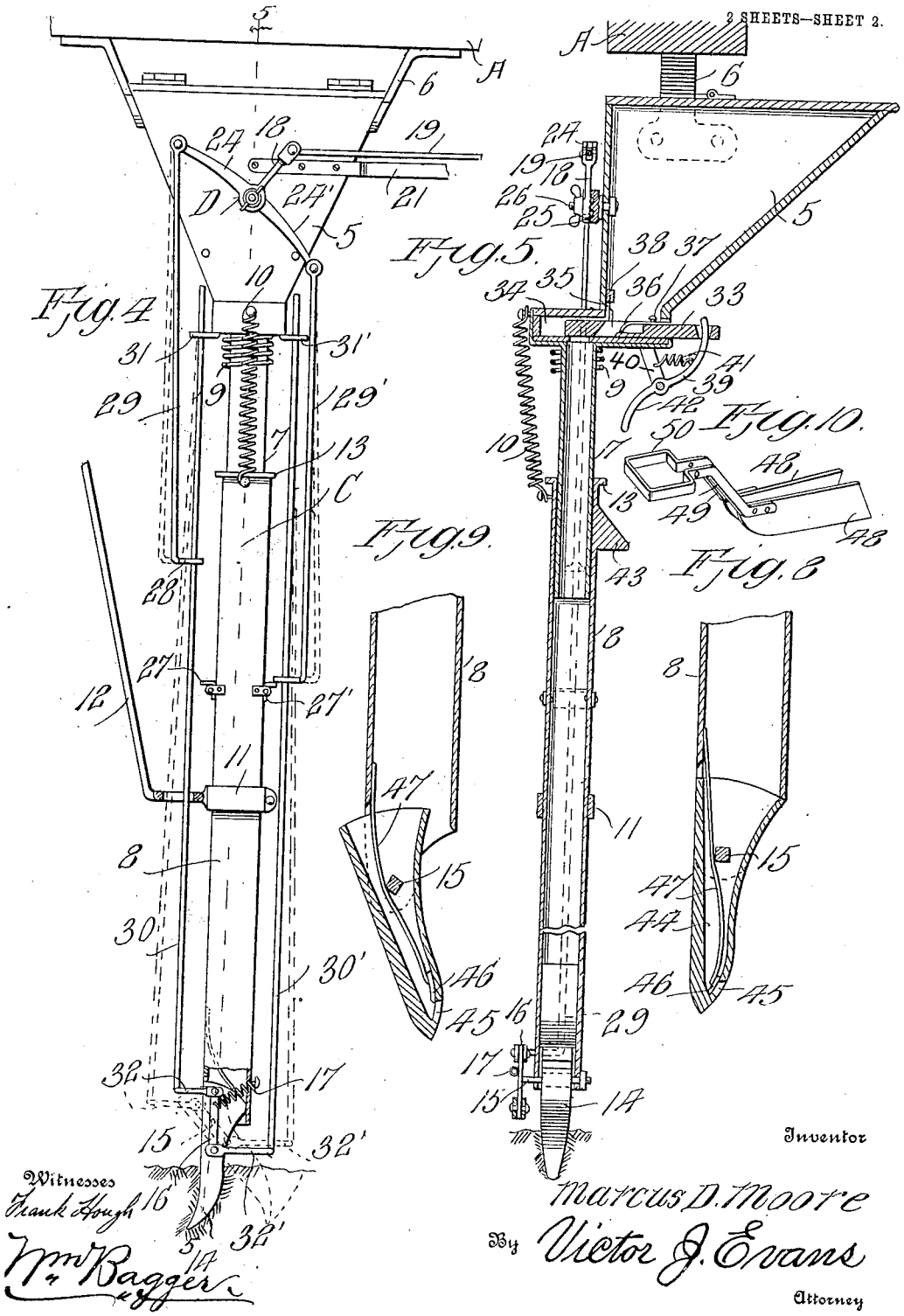

UNITED STATES PATENT OFFICE.

MARCUS D. MOORE, OF WAVELAND, INDIANA, ASSIGNOR OF ONE-HALF TO HENRY H. LOUGH, OF WAVELAND, INDIANA.

REPLANTING ATTACHMENT FOR CULTIVATORS.

No. 906,446.　　　Specification of Letters Patent.　　　Patented Dec. 8, 1908.

Application filed April 7, 1908.　Serial No. 425,759.

*To all whom it may concern:*

Be it known that I, MARCUS D. MOORE, a citizen of the United States, residing at Waveland, in the county of Montgomery and State of Indiana, have invented new and useful Improvements in Replanting Attachments for Cultivators, of which the following is a specification.

This invention relates to replanting attachments for cultivators, and it has for its object to simplify and improve the construction and operation of this class of devices, and to present a replanting attachment which will possess superior advantages in point of simplicity, durability and general efficiency.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being however understood that no limitation is necessarily made to the precise structural details therein exhibited, but that changes, alterations and modifications within the scope of the invention may be resorted to when desired.

In the drawings—Figure 1 is a side view showing a conventional form of cultivator equipped with the improved replanting attachment. Fig. 2 is a side view on a larger scale showing the replanter detached, and showing the seed tube part-way lowered. Fig. 3 is a rear view of the replanter, detached. Fig. 4 is a side view showing the replanter on a still larger scale, and showing the seed tube lowered and the plow in engagement with the ground. Fig. 5 is a vertical sectional view taken on the plane indicated by the line 5—5 in Fig. 4. Fig. 6 is a sectional detailed view showing the preferred form of plow connected with the lower end of the seed tube. Fig. 7 is a similar view showing the plow tilted. Fig. 8 is a sectional view illustrating a modified form of plow. Fig. 9 is a similar view showing the plow tilted. Fig. 10 is a perspective detailed view showing a covering device which may be used in connection with the invention.

Corresponding parts in the several figures are denoted by like characters of reference.

The improved replanting attachment comprises a seed receptacle or hopper 5 adapted to be suitably attached to and connected with some convenient part such as the tongue A of a cultivator B, a conventional form of which has been illustrated in Fig. 1 of the drawings. Supporting brackets 6 for the hopper have been shown suitably attached to the cultivator tongue.

The seed tube C which extends downwardly from the hopper is composed of a stationary tubular member 7 which is suitably connected with the underside of the hopper, and a vertically slidable tubular extension 8 which telescopes upon the stationary tube 7; a buffer-spring 9 is mounted upon the upper end of the stationary tube to take up the jar or concussion caused by the upward movement of the extension tube 8 under the influence of a suitably arranged retracting spring, 10. The extension tube is guided in a sleeve 11 upon the lower end of a brace 12 the upper end of which may be connected with the underside of the cultivator tongue. The upper extremity of the extension tube 8 has a flange or collar 13 adapted to engage the cushion-spring or buffer 9; the lower end of the extension tube carries the plow or furrow opener 14 having a pin 15 extending transversely therethrough and connected rigidly therewith, the ends of said pin constituting trunnions whereby the plow is pivotally supported in the side walls of the tube. Secured upon one end of the axial pin 15 is an arm or lever 16 which is connected by a spring 17 with a stationary point of the seed tube, for the purpose of retaining the plow normally in an approximately vertical ground-engaging position, when the upper end of the plow point, as will be best seen in Figs. 4 and 6, will obstruct the lower end of the seed tube and constitute a seed supporting valve. When the upper extremity of the plow is tilted in a forward direction, against the tension of the spring 17, seed may psss from the lower end of the seed tube over the rear side or heel of the plow into the aperture in the ground formed for its reception.

Pivotally supported upon one side of the hopper is a T-shaped lever D, the upward extending arm of which 18 is connected pivotally with one end of an operating rod 19 a guide for which 20 is supported by an arm or bracket 21 bolted upon and extending rearwardly from the hopper; the operating rod, which is equipped with a handle 22 is extended within convenient reach of the operator for whom a seat 23 is provided. The T-lever D is provided with forward and rearward extending arms 24, 24′, which are preferably provided with radially corrugated rosettes 25 engaging a similarly corrugated or serrated portion upon the arm 18 with which the said arms 24 and 24′ may thus be adjustably connected by means of the fulcrum pin or bolt 26.

Hingedly secured upon the front and rear walls of the extension member 8 of the seed tube are L-shaped latch-members 27, 27′ adapted to be engaged by the shoes 28, 28′ at the lower ends of links 29, 29′ which are pivotally connected with the ends of the arms 24′, 24′ of the lever D. The shoes 28, 28′ are provided with apertures for the passage of trigger-rods 30, 30′, the upper ends of which are guided through eyes or apertured brackets 31, 31′ upon the front and rear sides of the hopper; the lower ends of said trigger rods being provided with cranks 32, 32′ that are pivotally connected respectively with the upper and lower ends of the arm 16 secured upon the axial pin 15 of the plow 14.

It will be readily seen that the arms 24, 24′ being connected adjustably with each other and with relation to the arm 18 of the lever D, said arms may be readily adjusted so as to bring the links 29, 29′ into proper position with relation to the latch members 27, 27′ upon the extension member of the seed tube; when the latter is raised, under the influence of the retracting spring 10, one of the latch members should be disposed adjacent to the under side of the shoe at the lower end of the link 29 or 29′, which at the time happens to be in a raised position.

The seed dropping mechanism comprises a slide 33 transversely movable in a recess 34 between the lower end of the hopper and the upper extremity of the seed tube, said slide being provided with an aperture or seed cup 35, the size of which may be gaged by a downturned flange 36 at one end of the regulating plate or member 37, secured upon the upper side of the seed-slide and movable therewith. A cut-off brush 38 is suitably secured upon the inside of the hopper to engage the upper side of the seed slide. The latter is actuated by a lever 39, pivoted upon a bracket 40 which is connected with said lever by a retracting spring 41; the operating lever 39 has a downturned end 42 which is adapted, on the upward movement of the extension member of the seed tube to be engaged by a lug 43 upon the latter for the purpose of actuating the seed slide in an upward direction, as will be readily understood by reference to Fig. 5 of the drawings.

The preferred form of plow which is illustrated in Figs. 6 and 7 of the drawings is so constructed that the upper end of said plow will constitute the foot-valve of the device upon which the seed is supported previous to being discharged; under the modified construction illustrated in Figs. 8 and 9, and which is especially adapted to be used in hard and caked soil, the plow is formed with a seed receiving pocket 44 having a discharge aperture 45 governed by a slide valve 46 mounted upon the lower end of a supporting spring 47, the upper end of which is suitably connected with the lower end of the seed tube. It will be readily seen that when the lower end of the plow is tilted in a rearward direction, the slide-valve will move to the open position indicated in Fig. 9, thus permitting the seed to escape.

A covering device, including a pair of covering blades or fenders 48 connected with shanks or brackets 49 extending downwardly from a clamping sleeve or collar 50 may be mounted upon the extension-member 8 of the seed tube near the lower end of the latter, as shown in Fig. 1 of the drawings, but such covering device may be dispensed with in the discretion of the manufacturer and the user of the device.

From the foregoing description taken in connection with the drawings hereto annexed, the operation and advantages of the invention will be readily understood by those skilled in the art to which it appertains. The improved replanting device may be readily attached to an ordinary cultivator. When it is desired to drop a charge of seed the operator by means of the rod 19 reverses the position of the lever D, thus causing the shoe at the lower end of one of the links 29 or 29′ to engage the corresponding latch-member 27 or 27′, thus forcing the extension member 8 of the seed-tube downward against the tension of the spring 10 until the point of the plow enters the ground; as the machine advances the plow-point becomes tilted upon its axial pin 15, by contact with the ground, thus causing the lower ends of the trigger-rods 30 and 30′ to be thrown respectively in a forward and a rearward direction, and said trigger-rods being slidably connected with apertured shoes at the lower ends of the links 29, 29′ will move said shoes outward from the front and rear walls of the seed tube, and out of the path of the latch members 27, 27′, thus permitting the extension member of the seed tube to be restored to its normal raised position under the influence of the retracting spring 10. When the extension tube 8 reaches the upper limit of its movement, the impact is received by the buffer 9, and while said extension tube moves upward, the plow will be restored to its initial position by the action of the spring 17. Upon the upward movement of the extension 8 the lug 43 engages the lever 39, moving the seed slide in an inward direction, and causing a charge of seed to be conveyed from the hopper to the upper end of the seed tube through which it drops until intercepted by the foot valve which, as herein described, may be formed by the body of the plow, or by the separate slide-valve 46; the tilting of the plow by engagement with the soil causes the charge of seed to be delivered into the opening formed by the plow; and when the extension-member of the seed tube moves downward, the lug 43 passes out of engagement with the lever 39 which, under the influence of the retracting spring 41 serves to move the seed slide in an outward direction to receive a charge of seed from the hopper. The latch-members 27, 27' will not obstruct the downward movement of the extension tube 8 by contact with the shoes 28, 28' at the lower ends of the links 29, 29' for the reason that, being hingedly connected with the seed-tube, they will yield to the shoes when engaged by the latter.

This improved replanting device, as will be seen from the foregoing description is simple in construction and easily operated, and it will be found thoroughly efficient for the purposes for which it is provided.

Having thus described the invention, what is claimed is:

1. In a replanting device, a seed tube including an extension tube, an earth-engaging member tiltingly connected with the latter, a retracting spring for the extension tube, means for forcing the extension-tube downward against the tension of the retracting spring, and a resilient buffer to receive the impact of the extension tube when retracted.

2. In a replanting device, a seed tube including an extension tube, an earth-engaging member tiltingly connected with the latter, a retracting spring for the extension tube, means for forcing the extension tube downward against the tension of the retracting spring and a spring actuating the tilting member to retain the latter normally in an obstructing position in the extension tube.

3. In a replanting device, a hopper, a seed tube connected therewith and including an extension tube, a seed slide disposed intermediate the hopper and the seed tube to convey charges of seed from the hopper to the tube, a spring actuated lever engaging the seed slide, a retracting spring for the extension tube, a lug upon the extension tube engaging the seed-slide actuating lever and an earth-engaging member tiltingly connected with the extension tube and constituting a foot-valve.

4. In a replanting device, a hopper having a seed tube including an extension tube, a retracting spring for the latter, a slide for conveying charges of seed from the hopper to the tube, a slide actuating lever operable by the extension tube upon the upward movement of the latter, an earth engaging member tiltingly connected with the seed-tube at the lower end of the extension portion of the latter, latch members hinged upon the extension tube, a rocking lever, links connected with the arms of the lever and having shoes engaging the latch members, an arm connected with the axis of the tilting earth-engaging member, and suitably guided trigger rods pivotally connected with said arm and extending through apertures in the latch engaging shoes.

5. In a replanting device, a seed tube including a spring actuated extension, latch-members hinged upon the latter, a rocking lever having oppositely extending adjustable arms, links connected pivotally with said arms and having shoes adapted to engage the latch members, and means for throwing said shoes out of the path of the latch members.

6. In a replanting device, a seed tube having a spring actuated extension member, latch members hinged upon the latter, an earth-engaging member tiltingly connected with the extension tube and constituting a foot-valve, a rocking lever having adjustable arms, links connected pivotally with said arms and having shoes engaging the latch members, a retracting spring for the tilting earth-engaging member, and suitably guided trigger rods actuated by said tilting member and engaging the shoes to throw the latter out of the path of the latch members upon the seed tube when the earth-engaging member is tilted.

In testimony whereof I affix my signature in presence of two witnesses.

MARCUS D. MOORE.

Witnesses:
OSCAR L. COOK,
DONALD J. BILBO.